United States Patent
Nonaka et al.

(10) Patent No.: US 6,212,472 B1
(45) Date of Patent: *Apr. 3, 2001

(54) METHOD AND APPARATUS FOR DISPLAYING CURRENT VEHICLE POSITION

(75) Inventors: Hiroshi Nonaka, Cupertino; Lihung Lin, Milpitas, both of CA (US)

(73) Assignee: Visteon Technologies, LLC, Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/923,502

(22) Filed: Sep. 4, 1997

(51) Int. Cl.$^7$ ................................................. G06F 165/00
(52) U.S. Cl. ............................ 701/208; 340/990; 340/995
(58) Field of Search .................................. 701/200, 202, 701/207, 208, 209, 211; 73/178 R; 340/988, 990, 995

(56) References Cited

U.S. PATENT DOCUMENTS

| | | | |
|---|---|---|---|
| 3,845,289 | 10/1974 | French | 235/151.2 |
| 4,570,227 | 2/1986 | Tachi et al. | 364/444 |
| 4,608,656 | 8/1986 | Tanaka et al. | 364/449 |
| 4,611,293 | 9/1986 | Hatch et al. | 364/571 |
| 4,672,565 | 6/1987 | Kuno et al. | 364/571 |
| 4,673,878 | 6/1987 | Tsushima et al. | 324/226 |
| 4,723,218 | 2/1988 | Hasebe et al. | 364/449 |
| 4,734,863 | 3/1988 | Honey et al. | 364/449 |
| 4,751,512 | 6/1988 | Longaker | 342/357 |
| 4,782,447 | 11/1988 | Ueno et al. | 364/449 |
| 4,796,191 | 1/1989 | Honey et al. | 364/450 |
| 4,797,841 | 1/1989 | Hatch | 364/571.04 |
| 4,831,563 | 5/1989 | Ando et al. | 364/571.05 |
| 4,862,398 | 8/1989 | Shimizu et al. | 364/571.05 |
| 4,914,605 | 4/1990 | Loughmiller, Jr. et al. | 364/518 |
| 4,918,609 | 4/1990 | Yamawaki | 364/449 |
| 4,926,336 | 5/1990 | Yamada | 364/444 |
| 4,937,753 | 6/1990 | Yamada | 364/449 |
| 4,964,052 | 10/1990 | Ohe | 364/449 |
| 4,970,652 | 11/1990 | Nagashima | 364/449 |
| 4,982,332 | 1/1991 | Saito et al. | 364/449 |

(List continued on next page.)

FOREIGN PATENT DOCUMENTS

| | | |
|---|---|---|
| 0 434 122 A1 | 6/1991 | (EP) . |
| 0 485 120 A2 | 5/1992 | (EP) . |
| 0 575 943 1 | 12/1993 | (EP) . |
| 0 636 863 A1 | 7/1994 | (EP) . |
| 2 271 423 | 4/1994 | (GB) . |

(List continued on next page.)

OTHER PUBLICATIONS

French, *MAP matching Origins Approaches and Applications*, Rober L. French & Associates, 3815 Lisbon St., Suite 201, Fort Worth, Texas 76107, USA, pp. 91–116.

(List continued on next page.)

*Primary Examiner*—Gary Chin
(74) *Attorney, Agent, or Firm*—Beyer Weaver & Thomas, LLP (57) ABSTRACT

Methods and apparatus are described for displaying information corresponding to a current vehicle position on a display of a vehicle navigation system. After the current vehicle position is determined by a separate process, the system determines the road on which the vehicle is currently located. The system then refers to a map database to construct a current road database corresponding to the current road. A current road segment corresponding to the current vehicle position is then determined. The system then refers to the current road database to determine a first geographical location based on the current vehicle road segment. The system then displays a text representation of the current vehicle position relative to the first geographical location.

19 Claims, 6 Drawing Sheets

U.S. PATENT DOCUMENTS

| | | | |
|---|---|---|---|
| 4,984,168 | 1/1991 | Neukrichner et al. | 364/449 |
| 4,989,151 | 1/1991 | Nuimura | 364/449 |
| 4,992,947 | 2/1991 | Nimura et al. | 364/444 |
| 4,996,645 | 2/1991 | Schneyderberg Van DerZon | 364/449 |
| 4,999,783 | 3/1991 | Tenmoku et al. | 364/450 |
| 5,040,122 | 8/1991 | Neukirchner et al. | 364/449 |
| 5,046,011 | 9/1991 | Kakihara et al. | 364/449 |
| 5,060,162 | 10/1991 | Ueyama et al. | 364/449 |
| 5,177,685 | 1/1993 | Davis et al. | 364/443 |
| 5,272,638 | 12/1993 | Martin et al. | 364/444 |
| 5,283,743 | 2/1994 | Odagawa | 364/457 |
| 5,287,297 | 2/1994 | Ihara et al. | 364/571.02 |
| 5,297,050 | 3/1994 | Ichimura et al. | 364/444 |
| 5,323,321 * | 6/1994 | Smith, Jr. | 340/990 |
| 5,369,588 | 11/1994 | Hayami et al. | 364/449 |
| 5,410,485 | 4/1995 | Ichikawa | 364/444 |
| 5,412,573 | 5/1995 | Barnea et al. | 364/449 |
| 5,444,629 * | 8/1995 | Kishi et al. | 701/211 |
| 5,452,212 * | 9/1995 | Yokoyama et al. | 701/211 |
| 5,463,554 | 10/1995 | Araki et al. | 364/444 |
| 5,486,822 | 1/1996 | Tenmoku et al. | 340/995 |
| 5,506,774 | 4/1996 | Nobe et al. | 364/424.05 |
| 5,513,110 | 4/1996 | Fujita et al. | 364/449 |
| 5,519,619 | 5/1996 | Seda | 364/444 |
| 5,521,826 | 5/1996 | Matsumoto | 364/449 |
| 5,729,109 * | 3/1998 | Kaneko et al. | 701/211 |
| 5,739,772 * | 4/1998 | Nanba et al. | 340/990 |
| 5,832,406 * | 11/1998 | Iwami et al. | 340/995 |
| 5,839,088 * | 11/1998 | Hancock et al. | 701/211 |
| 5,845,226 * | 12/1998 | Ajima | 701/211 |
| 5,874,905 * | 2/1999 | Nanba et al. | 340/995 |
| 5,890,088 * | 3/1999 | Nimura et al. | 701/211 |
| 5,908,465 * | 6/1999 | Ito et al. | 701/211 |

FOREIGN PATENT DOCUMENTS

| | | |
|---|---|---|
| 6-222125 | 8/1994 | (JP) . |
| 6-331379 | 12/1994 | (JP) . |
| 7-294273 | 11/1995 | (JP) . |
| 9-33268 | 2/1997 | (JP) . |

OTHER PUBLICATIONS

Dingus, T. et al, *Human Factors Engineering the TravTek Driver Interface*, Oct. 1, 1999, Proceedings of the Vehicle Navigation and Information Systems Conference, pp. 749–755.

Kirson, A M, *A Compact Driver Interface for Navigation and Route Guidance*, Jul. 30, 1995, Proceedings of the Vehicle Navigation and Information Systems Conference, pp. 61–66.

* cited by examiner

METHOD AND APPARATUS FOR DISPLAYING CURRENT VEHICLE POSITION

BACKGROUND OF THE INVENTION

The present invention relates to techniques for displaying position information in a vehicle navigation system. More specifically, the present invention provides methods and apparatus for displaying the current vehicle position relative to a variety of landmarks such as, for example, the nearest intersection.

Currently available vehicle navigation systems communicate the current vehicle position to users according to a variety of techniques. According to a first technique shown in FIG. 1, a vehicle icon 100 is superimposed on a map grid 102. However, because of its abstract format, and because of screen size and map scale limitations, it is sometimes quite difficult for a user who is unfamiliar with a particular geographic area to synthesize data presented according to this technique. That is, the vehicle icon is typically presented in a scale much larger than that of the map grid while many of the street names are not presented on the map grid to avoid cluttering the display with text. Thus, the user only sees an approximation of the vehicle's position.

Figure 1:
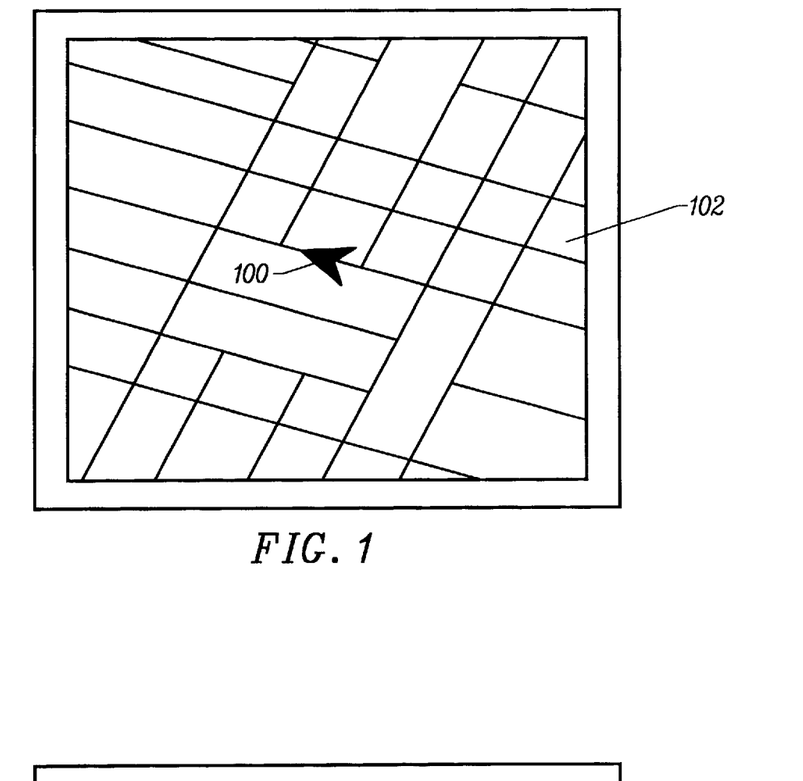
FIG. 1 illustrates a technique for displaying vehicle position information in a vehicle navigation system.
Figure 2:
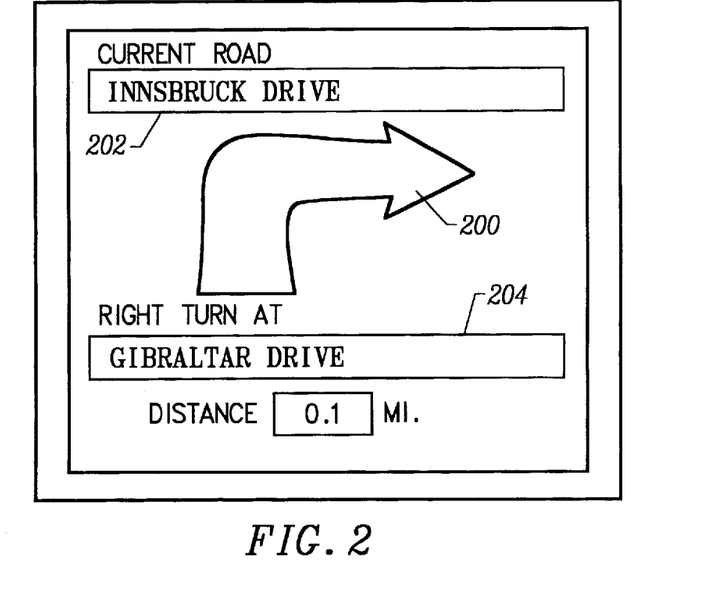
FIG. 2 illustrates a technique for displaying navigational information in a vehicle navigation system.

Alternatively, as shown in FIG. 2, a maneuver icon 200 may be displayed representing a particular type of maneuver (a right turn is shown) along with the names of the street on which the vehicle is proceeding (field 202) and the street at which the upcoming maneuver is to be executed (field 204). Unfortunately, even though this technique presents information in a more concrete form than described above with reference to FIG. 1, more specific position information is desirable in a variety of situations such as when the vehicle is stopped for a roadside emergency. Important information in such a situation might include, for example, the city in which the vehicle is currently located, the cross streets closest to the current vehicle position (both ahead and behind), and the distance to the next cross street. This type of information is particularly useful in emergency situations because the user must quickly determine and supply location information to, for example, vehicle towing services, paramedics, or police dispatch. These emergency response resources typically require an address or the nearest cross street to ensure a quick response. Unfortunately, the above described techniques do not present position information in a way that is readily useful in such situations. The technique of FIG. 1 typically does not provide enough detail, while the technique of FIG. 2 only provides information about an approaching landmark as the vehicle is moving.

It is therefore apparent that there is a need for methods and apparatus in a vehicle navigation system which present vehicle position information to the user in a detailed, concise, and easy-to-understand manner.

SUMMARY OF THE INVENTION

According to the present invention, methods and apparatus are provided in a vehicle navigation system which enable the system to display position information in a variety of formats which are useful in roadside emergencies. The system of the present invention employs a number of display modes which present position and/or navigational information to the user according to different formats. These display modes include a map mode in which a vehicle icon is shown superimposed on a map grid as shown in FIG. 1, and a route guidance mode in which maneuver icons are presented to the user for each successive maneuver in a predetermined route as shown in FIG. 2.

According to various embodiments of the invention, other display modes are also provided which present vehicle position information relative to nearby landmarks such as intersections and street addresses. For example, in a first display mode, the displayed position information includes the city and current road on which the vehicle is located, the nearest cross street, and the distance to the cross street. In a second display mode, the displayed position information for a stopped vehicle includes the current (or approximate) street address, the city, and the nearest intersections on either side of the vehicle.

Thus, according to one embodiment a method for displaying information corresponding to a current vehicle position on a display of a vehicle navigation system is provided. The system determines the road on which the vehicle is currently located. The system then refers to a map database to construct a current road database corresponding to the current road. A current road segment corresponding to the current vehicle position is then determined. The system then refers to the current road database to determine a first geographical location based on the current road segment. The system then displays a text representation of the current vehicle position relative to the first geographical location. According to a specific embodiment, the vehicle's position is initially determined using a global positioning satellite (GPS) system.

A further understanding of the nature and advantages of the present invention may be realized by reference to the remaining portions of the specification and the drawings.

DESCRIPTION OF THE PREFERRED EMBODIMENT

The present invention relates generally to commonly assigned U.S. Pat. No. 5,345,382 to Kao for CALIBRATION METHOD FOR A RELATIVE HEADING SENSOR, U.S. Pat. No. 5,359,529 to Snider for ROUTE GUIDANCE ON/OFF-ROUTE STATE FILTER, U.S. Pat. No. 5,374,933 to Kao for POSITION CORRECTION METHOD FOR VEHICLE NAVIGATION SYSTEM, and U.S. Pat. No. 5,515,283 to Desai for METHOD FOR IDENTIFYING HIGHWAY ACCESS RAMPS FOR ROUTE CALCULATION IN A VEHICLE NAVIGATION SYSTEM, the entire specifications of which are incorporated herein by reference.

Figure 3:
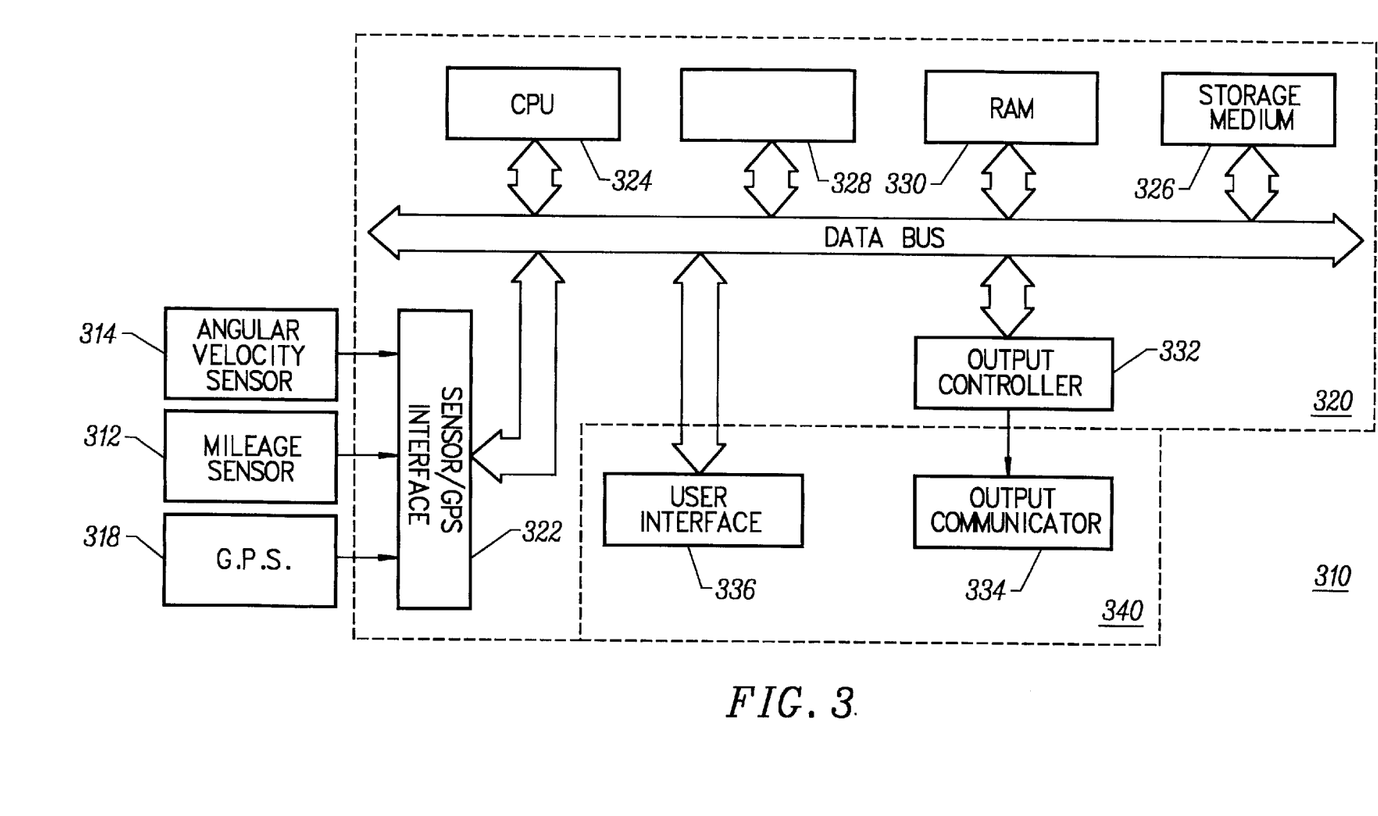
FIG. 3 is a block diagram of a vehicle navigation system for use with the present invention.

FIG. 3 is a block diagram of a specific embodiment go of a vehicle navigation system 310 for use with the present invention. Sensors 312 and 314 and GPS receiver 318 are coupled to computing means 320 through sensor/GPS interface 322. In typical embodiments, mileage sensor 312 comprises an odometer, and angular velocity sensor 314 comprises a gyroscope, or a differential odometer coupled to the wheels of the vehicle. A global positioning system (GPS) data receiver 318 is provided for receiving signals from, for example, a satellite-based navigation system. Data from sensor/GPS interface 322 is transmitted to CPU 324, which performs calibration, signal processing, dead-reckoning, vehicle positioning, and route guidance functions. A database containing map information may be stored in database medium 326, with software directing the operation of computing means 320 stored in main memory 328 for execution by CPU 324. Memory 328 may comprise read-only memory (ROM), or reprogrammable non-volatile memory such as flash memory or SRAM. System RAM 330 permits reading and writing of the information necessary to execute such software programs. Database medium 326 may comprise non-volatile memory, a hard disk drive, CD-ROM, or an integrated circuit in which digitized map information has been stored. Output controller 332, which may comprise a graphics controller, receives data processed by CPU 324 and transmits the data to display console 340 which includes output communicator 334, usually comprising a display screen. The user may input data, such as a desired destination, through user interface 336, typically comprising a keyboard.

The map database stored in database medium 326 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a hierarchy value which relates to the category or type of the road. For example, the highest level category of the hierarchy includes freeways and expressways. The lowest level includes residential streets and/or alleys.

Figure 4:
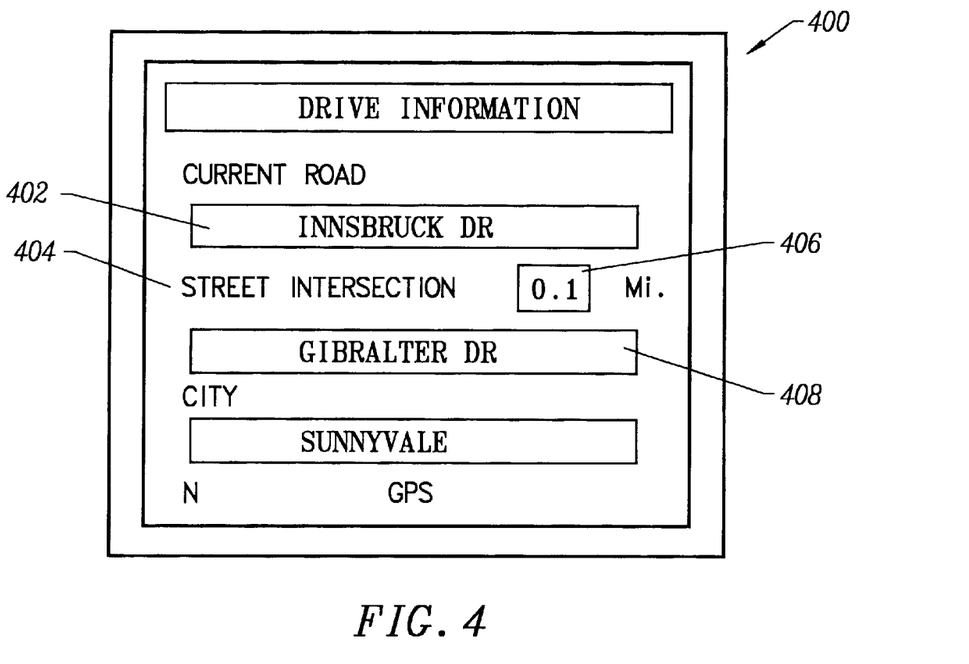
FIG. 4 is a representation of a display screen which illustrates the type of vehicle position information provided to the user according to a first embodiment of the invention.

FIG. 4 is a representation of a display screen 400 which illustrates the type of vehicle position information provided to the user according to a first embodiment of the invention. The current road on which the vehicle is located, i.e., Innsbruck Drive, is indicated in field 402. Below the current road, the type of cross road ahead, i.e., street intersection, is indicated (field 404) as well as the distance to the cross road from the vehicle's current position (field 406). The name of the upcoming cross road, i.e., Gibraltar Drive, is indicated in field 408. Finally, field 410 indicates the city in which the vehicle is located. This display mode may be employed when the vehicle is moving or stopped.

The information shown on display screen 400 is obtained in the following manner. The system first establishes a vehicle position using GPS. It then identifies the city and current road on which the vehicle is located. A map database utility then obtains the entire structure of the current road on which the vehicle is currently located and creates a separate database file. Determination of the structure involves identifying each of the nodes and segments in the current road and selected road segments emanating from the nodes of the current road, i.e., the significant intersections. Thus, the system does not need to refer to the so entire map database each time the vehicle's position is updated. This greatly reduces the time which would otherwise be required to update the position information. According to various embodiments, the system may be programmed to repeat this process at regular intervals, e.g., every 0.5 seconds. Alternatively, the system may be configured to display this type of position information each time it is requested by the user.

It is important to note that not all road segments emanating from current road nodes are treated in the same way by this utility. Only road segments in certain categories are considered for display as an approaching intersection. More specifically, segments from minor side streets or alley ways are ignored in favor of segments from more readily identifiable roads such as major cross streets, expressways, and freeways. In this way, the user is provided with position information which is practically useful for emergency situations.

During normal system operation, the intersection ahead of the current vehicle position is obtained using a node-segment searching algorithm in which the system refers to the separate database file created for the current road. The system determines whether there are any road segments attached to the end node of the current segment to thereby determine whether the node represents a cross street of interest. If no such segments are identified, the end node of the next segment in the current road is searched in the same manner. This search algorithm is continued until an appropriate intersection is found or until the search extends more than one mile along the current road from the current vehicle position. According to a specific embodiment, the extent of the search depends upon the type of road on which the vehicle is traveling. If, for example, the vehicle is on a freeway, the search may extend beyond the one mile limit until an appropriate node, e.g., an exit, is encountered. If, however, the vehicle is on a residential street and the search reaches the one mile limit, the system displays the next minor intersection. If no such intersection exists, the system informs the users that no street exists. Alternatively, if there is a dead end, the system informs the user that she is approaching a dead end.

According to a specific embodiment, where the search algorithm encounters a "T" with two different intersecting street names emanating from the node, the system identifies the upcoming intersection using both names. According to another embodiment, where the search algorithm encounters a dead end, the user is informed that the current road is not a through street.

Figure 5:
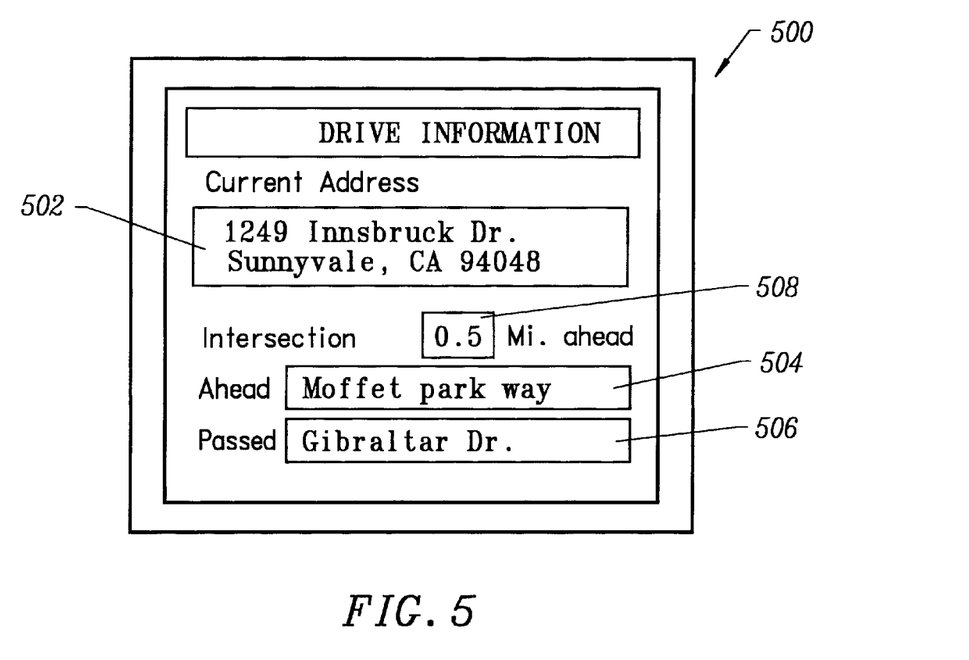
FIG. 5 is a representation of a display screen which illustrates the type of vehicle position information provided to the user according to a second embodiment of the invention.

FIG. 5 is a representation of a display screen 500 which illustrates the type of vehicle position information provided to the user according to a second embodiment of the invention. The street address and city where the vehicle is currently located are indicated in field 502. According to one embodiment, the street address is determined based on the address range associated with the portion (e.g., block) of the current road on which the vehicle is currently located and the position of the vehicle on that block. The address range information is included in the separate database file created for the current road. So, for example, if the vehicle is one-third of the way down the block and the address range is 100–400, the system will display an address of 200.

Fields 504 and 506 indicate the nearest intersections ahead of and behind the vehicle, respectively. Field 508 indicates the distance to the intersection shown in field 504. The information in field 504 is obtained using the search algorithm described above with reference to FIG. 4. The information in field 506 may be obtained using a similar search algorithm moving backward from the current vehicle position. Alternatively, the system may store the most recently passed intersection and update this information each time the vehicle passes the next intersection. This display mode may also be used when the vehicle is either moving or stopped. However, it will be understood that it is more appropriate for stopped vehicles given that a fairly precise location, i.e., a street address is determined.

Figure 6:
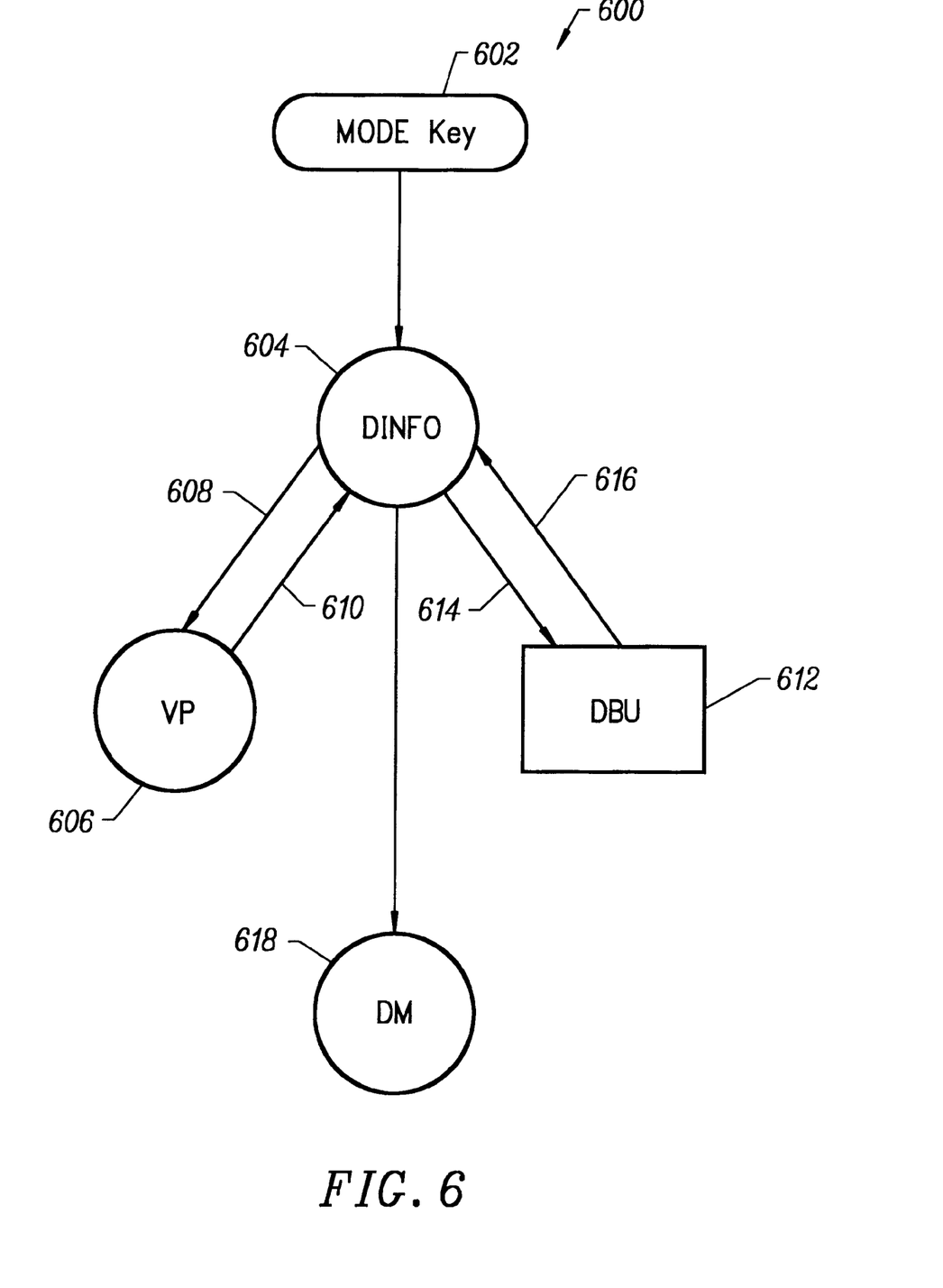
FIG. 6 is a task flow diagram which illustrates the manner in which vehicle position information is obtained and updated according to the present invention.

FIG. 6 is a task flow diagram 600 which illustrates the manner in which vehicle position information is obtained and updated according to the present invention. The user employs the mode key 602 to select a drive information display mode as described with reference to FIG. 4 or FIG. 5. Drive information process (DINFO) 604 requests and receives current vehicle position information from vehicle position process (VP) 606 as indicated by arrows 608 and 610, respectively. DINFO 604 then calls map database utility (DBU) 612 to obtain information about the upcoming intersection based on the current vehicle position using the database file corresponding to the current road (arrow 614). DBU 612 returns the name and type of the cross road corresponding to the intersection and the distance to the cross road from the current vehicle position to DINFO 604 (arrow 616). DINFO 604 then sends the information to display module (DM) 618 to be displayed to the user. This may be done periodically if the vehicle is moving, or only once if the vehicle is stopped.

Figure 7:
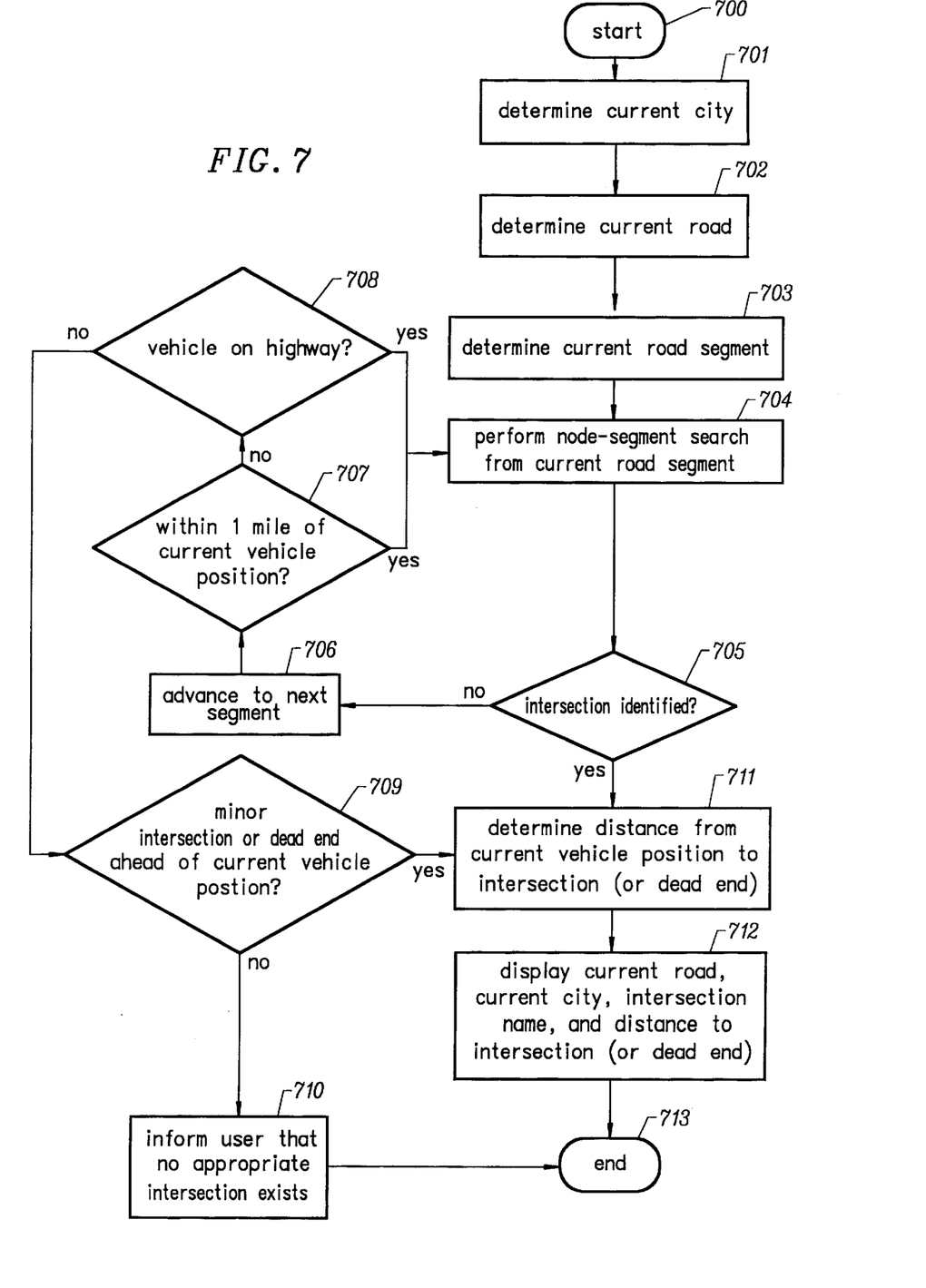
FIG. 7 is a flowchart illustrating the operation of a specific embodiment of the present invention.

FIG. 7 is a flowchart illustrating the operation of a specific embodiment of the present invention. After the VP process determines the vehicle position (see FIG. 6), the system determines the current city in which the vehicle is located (step 701), the current road on which the vehicle is proceeding (step 702), and the segment of the current road corresponding to the current vehicle position (step 703). A node-segment search as described above with reference to FIGS. 4 and 5 is performed from the end node of the road segment (step 704). If an appropriate cross-street is not identified at that node (step 705), the search algorithm proceeds to the next segment in the current road (step 706) and determines whether that segment is within one mile of the current vehicle position (step 707). If so, another node-segment search is performed. If not, and the vehicle is on a highway (step 708) node-segment searches continue until a cross street is located. If, however, the vehicle is not on the highway, the system determines whether there is a minor intersection or dead end ahead of the vehicle position (step 709). If no such intersection or dead end exists, the system informs the user with the appropriate message (step 710).

If an appropriate intersection or dead end is identified the distance from the current vehicle position to the intersection or dead end is determined (step 711). Finally, the current road, current city, upcoming intersection name (if applicable), and the distance to the intersection or dead end from the current vehicle position are provided to the user on the display of the vehicle navigation system (step 712). This information may be periodically updated, i.e., the process flow periodically repeated, or in response to a user request. It will be understood that this embodiment of the invention may be employed whether the vehicle is moving or not.

Figure 8:
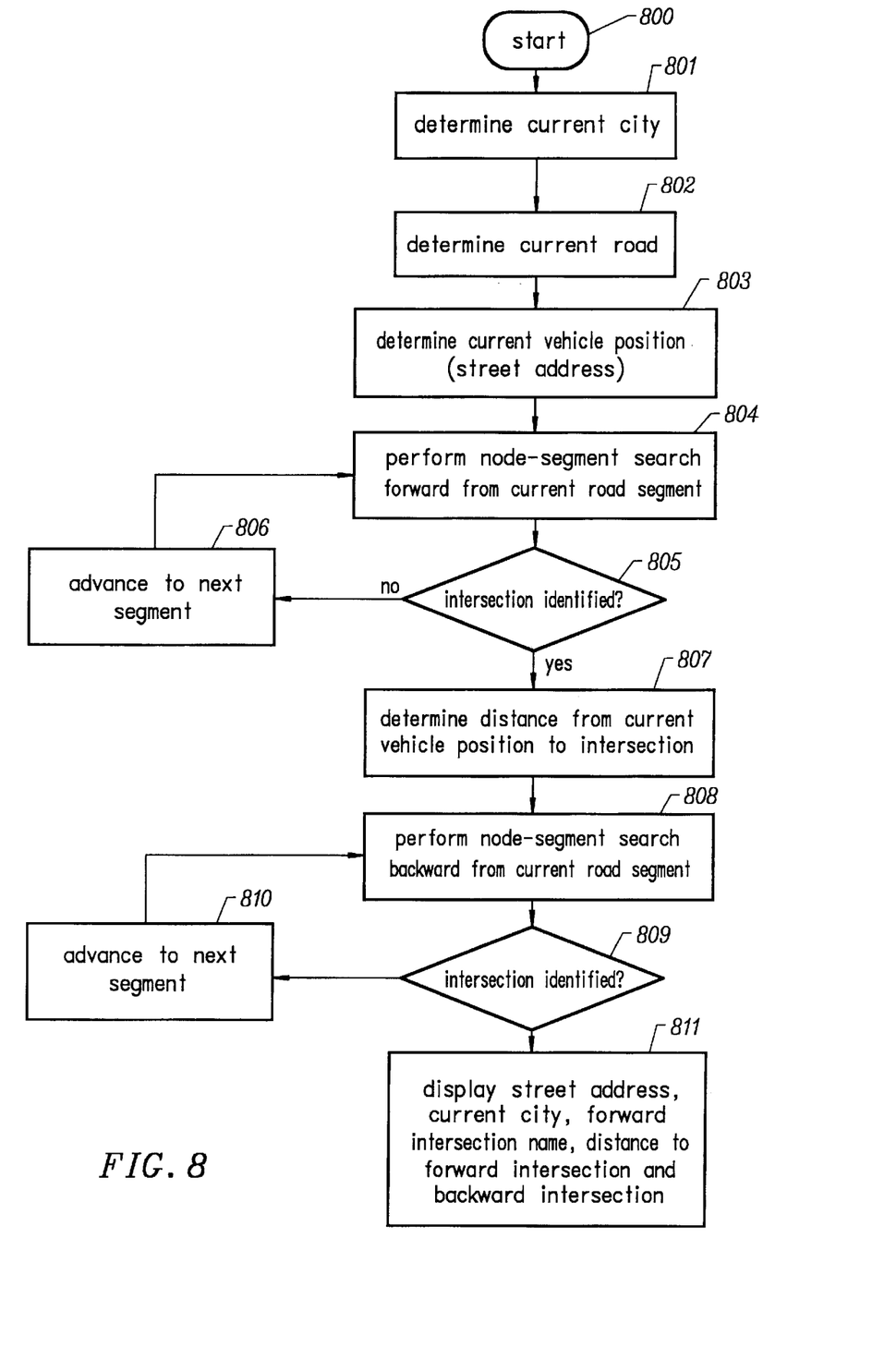
FIG. 8 is a flowchart illustrating the operation of another specific embodiment of the invention.

FIG. 8 is a flowchart illustrating the operation of another specific embodiment of the present invention. Using the vehicle position generated in the VP process (see FIG. 6), the system determines the current city and road on which the vehicle is located (steps 801 and 802), and the street address corresponding to the current vehicle position (step 803). A node-segment search is then performed forward from the current road segment (step 804). If an appropriate cross-street is not identified at the first node (step 805), the search algorithm proceeds to the next segment in the current road (step 806) and performs another node-segment search. If, on the other hand, an appropriate intersection is identified the distance from the current vehicle position to the intersection is determined (step 807). Another node-segment search is performed moving backward from the current road segment until the most recently passed intersection is identified (steps 808–810). Finally, the street address, current city, upcoming intersection name, the distance to the upcoming intersection, and the most recently passed intersection are displayed for the user (step 811). It will be understood that this embodiment of the invention is most appropriate for use with a stopped vehicle.

While the invention has been particularly shown and described with reference to specific embodiments thereof, it will be understood by those skilled in the art that changes in the form and details of the disclosed embodiments may be made without departing from the spirit or scope of the invention. Therefore, the scope of the invention should be determined with reference to the appended claims.

What is claimed is:

1. A method for displaying information corresponding to a current vehicle position on a display of a vehicle navigation system comprising the steps of:
   (A) determining a current road;
   (B) referring to a map database to construct a separate current road database, the current road database being a subset of the map database and comprising first nodes and first segments corresponding to the current road and second segments emanating from selected ones of the first nodes;
   (C) determining a current road segment corresponding to the current vehicle position;
   (D) referring to the current road database to determine a first geographical location based on the current road segment; and
   (E) displaying a text representation of the current vehicle position relative to the first geographical location.

2. The method of claim 1 wherein the first geographical location comprises a first intersection near the current vehicle position.

3. The method of claim 2 wherein the vehicle is on a route, the first intersection being immediately ahead of the current vehicle position on the route.

4. The method of claim 3 further comprising the step of displaying a distance to the first intersection from the current vehicle position.

5. The method of claim 1 wherein steps (C)–(E) are performed periodically.

6. The method of claim 1 wherein the referring step determines a second geographical location and the text representation of the current vehicle position refers to the second geographical location.

7. The method of claim 6 wherein the first and second geographical locations comprise first and second intersections near the current vehicle position.

8. The method of claim 7 wherein the vehicle is on a route, the first intersection being ahead of the current vehicle position on the route, and the second intersection being behind the current vehicle position on the route.

9. The method of claim 1 wherein steps (C)–(E) are performed for a plurality of pairs of intersections on the current road.

10. The method of claim 8 further comprising the step of displaying a distance to the first intersection from the current vehicle position.

11. The method of claim 1 wherein the first geographical location comprises a street address corresponding to the current vehicle position.

12. The method of claim 11 wherein the vehicle is stopped on a route, the method further comprising the step of receiving user input requesting street address information, steps (A)–(E) being performed in response to the user input.

13. The method of claim 6 wherein the first and second geographical locations comprise a street address corresponding to the current vehicle position and a first intersection near the current vehicle position, respectively.

14. The method of claim 13 wherein the vehicle is on a route, the first intersection being immediately ahead of the current vehicle position on the route.

15. The method of claim 14 further comprising the step of displaying a distance to the first intersection from the current vehicle position.

16. The method of claim 1 further comprising the steps of:
   determining whether the current road has changed; and
   repeating steps (A)–(E) when the current road has changed.

17. An apparatus for displaying information corresponding to a current vehicle position on a display of a vehicle navigation system comprising:
   (A) means for determining a current road;
   (B) means for referring to a map database and constructing a separate current road database, the current road database being a subset of the map database and comprising first nodes and first segments corresponding to the current road and second segments emanating from selected ones of the first nodes;
   (C) means for determining a current road segment corresponding to the current vehicle position;
   (D) means for referring to the current road database and determining a first geographical location based on the current road segment; and
   (E) means for displaying a text representation of the current vehicle position relative to the first geographical location.

18. A vehicle navigation system, comprising:
   a plurality of sensors for detecting a current vehicle position and a vehicle heading, and generating signals indicative thereof;
   a display for communicating the current vehicle position to a user;
   a database medium having map data stored therein; and
   a processor coupled to the sensors, the display, and the database medium, the processor being operable to
   (A) determine a current road;
   (B) refer to the database medium and construct a separate current road database, the current road database being a subset of the map database and comprising first nodes and first segments corresponding to the current road and second segments emanating from selected ones of the first nodes;
   (C) determine a current road segment corresponding to the current vehicle position;
   (D) refer to the current road database and determine a first geographical location based on the current road segment; and
   (E) display a text representation of the current vehicle position relative to the first geographical location.

19. A computer program product for displaying information corresponding to a current vehicle position on a display of a vehicle navigation system, comprising:
   a computer-readable medium; and
   a computer program mechanism embedded in the computer-readable medium for causing a computer to perform the steps of:
   (A) determining a current road;
   (B) referring to a map database to construct a separate current road database, the current road database being a subset of the map database and comprising first nodes and first segments corresponding to the current road and second segments emanating from selected ones of the first nodes;
   (C) determining a current road segment corresponding to the current vehicle position;
   (D) referring to the current road database to determine a first geographical location based on the current road segment; and
   (E) displaying a text representation of the current vehicle position relative to the first geographical location.

* * * * *